United States Patent
Suzuki

(10) Patent No.: US 10,482,354 B2
(45) Date of Patent: Nov. 19, 2019

(54) CREATION DEVICE, COMPUTER PROGRAM PRODUCT, RECOGNITION SYSTEM, AND CREATION METHOD

(71) Applicants: Kabushiki Kaisha Toshiba, Minato-ku (JP); Toshiba Digital Solutions Corporation, Kawasaki-shi (JP)

(72) Inventor: Tomohisa Suzuki, Mitaka (JP)

(73) Assignees: Kabushiki Kaisha Toshiba, Minato-ku (JP); Toshiba Digital Solutions Corporation, Kawasaki-shi (JP)

( * ) Notice: Subject to any disclaimer, the term of this patent is extended or adjusted under 35 U.S.C. 154(b) by 149 days.

(21) Appl. No.: 15/710,982

(22) Filed: Sep. 21, 2017

(65) Prior Publication Data

US 2018/0260666 A1 Sep. 13, 2018

(30) Foreign Application Priority Data

Mar. 8, 2017 (JP) .................................. 2017-044164

(51) Int. Cl.
*G06K 9/62* (2006.01)
*H04N 1/00* (2006.01)
(Continued)

(52) U.S. Cl.
CPC ......... *G06K 9/6277* (2013.01); *G06K 9/2063* (2013.01); *G06K 9/6265* (2013.01);
(Continued)

(58) Field of Classification Search
CPC .. G06K 9/6277; G06K 9/6878; G06K 9/6265; G06K 9/2063; G06K 2209/01; G06K 9/685; H04N 1/32133; H04N 1/00331; H04N 2201/3226; H04N 2201/0082; H04N 2201/323
(Continued)

(56) References Cited

U.S. PATENT DOCUMENTS 6,205,261 B1 * 3/2001 Goldberg ................. G06K 9/03
382/187
9,092,774 B2 * 7/2015 Becorest .............. G06Q 20/342
(Continued)

FOREIGN PATENT DOCUMENTS

JP 58-165180 9/1983
JP 07-152854 6/1995

*Primary Examiner* — Sheela C Chawan
(74) *Attorney, Agent, or Firm* — Oblon, McClelland, Maier & Neustadt, L.L.P.

(57) ABSTRACT

According to an embodiment, a creation device creates a code table including a plurality of code words. A recognition device identifies a code word represented by a code image based on a result of character recognition of the code image formed on an object, the code table, and a confusion matrix preliminarily created. The confusion matrix represents probabilities that characters are recognized when the recognition device performs character recognition on an image. The creation device includes a change unit, an evaluation value calculation unit, and a control unit. The change unit changes the code table. The evaluation value calculation unit calculates an evaluation value of the changed code table using the confusion matrix. The control unit causes the change of the code table and the calculation of the evaluation value to be repeated such that the evaluation value becomes small.

15 Claims, 11 Drawing Sheets

(51) Int. Cl.
  *H04N 1/32* (2006.01)
  *G06K 9/20* (2006.01)
  *G06K 9/68* (2006.01)

(52) U.S. Cl.
  CPC ....... *G06K 9/6878* (2013.01); *H04N 1/00331* (2013.01); *H04N 1/32133* (2013.01); *G06K 9/685* (2013.01); *G06K 2209/01* (2013.01); *H04N 2201/0082* (2013.01); *H04N 2201/323* (2013.01); *H04N 2201/3226* (2013.01)

(58) Field of Classification Search
  USPC ....... 382/100, 141, 160, 181, 182, 183, 185, 382/187, 188, 190, 196, 232, 274, 275, 382/305, 306; 704/200, 231, 243; 706/15, 26, 27, 31; 356/237.1, 237.2
  See application file for complete search history.

(56) References Cited

U.S. PATENT DOCUMENTS

| | | | |
|---|---|---|---|
| 9,411,013 B2* | 8/2016 | Richards | G01R 31/308 |
| 2004/0141645 A1* | 7/2004 | Lee | G06K 9/325 |
| | | | 382/182 |

* cited by examiner

FIG.3

| CODE INDEX | CODE WORD |
|---|---|
| 1 | 595b1dc1 |
| 2 | b4fb5652 |
| 3 | 2d13b358 |
| ⋮ | ⋮ |
| m | d0fa01fa |

FIG.4

0123456789abcdef

CREATION DEVICE, COMPUTER PROGRAM PRODUCT, RECOGNITION SYSTEM, AND CREATION METHOD

CROSS-REFERENCE TO RELATED APPLICATIONS

This application is based upon and claims the benefit of priority from Japanese Patent Application No. 2017-044164, filed on Mar. 8, 2017; the entire contents of which are incorporated herein by reference.

FIELD

Embodiments described herein relate generally to a creation device, a computer program product, a recognition system, and a creation method.

BACKGROUND

Systems have been known that identify, track, manage, and search for objects using identification numbers printed on the objects such as forms and products. In an example of such systems, the identification number printed on the object is automatically recognized using imaging processing and optical character recognition processing.

In such a system, processing is often performed to correct false recognition using some kind of method when character recognition processing is performed. As typical processing to correct false recognition, the correction processing is known, such as word post-processing, n-gram post-processing, and correction processing using algebraic error correction codes such as Bose-Chaudhuri-Hocquenghem (BCH) codes, for example.

When an identification number on the object is recognized, the word post-processing and the n-gram post-processing cannot be used as the correction processing. In the correction processing using algebraic error correction codes, character kinds capable of being used in the correction processing are limited. The word post-processing, the n-gram post-processing, and the correction processing using algebraic error correction codes cannot reflect inherent tendency in false recognition in the optical character recognition processing, for example, in the correction processing.

BRIEF DESCRIPTION OF THE DRAWINGS

FIG. 3 is a schematic diagram illustrating an example of a code table;

FIG. 4 is a schematic diagram illustrating an example of a character set;

DETAILED DESCRIPTION

A creation device according to each of the following embodiments creates a code table used by an image forming device and a recognition device, the code table including a plurality of code words. The image forming device forms a code image representing a code word selected from the code table on an object. The recognition device identifies the code word represented by the code image based on a result of character recognition of the code image formed on the object, the code table, and a confusion matrix preliminarily created. The confusion matrix represents the probabilities that characters represented by an image are recognized as the respective characters, when the image forming device forms, on the object, the image representing the characters, and the image recognition device performs character recognition on the image. The creation device includes a change unit, an evaluation value calculation unit, and a control unit. The change unit changes the code table. The evaluation value calculation unit calculates, using the confusion matrix, an evaluation value representing a possibility that the code word included in the changed code table is wrongly recognized. The control unit causes the change of the code table and the calculation of the evaluation value to be repeated such that the evaluation value becomes small, and outputs the code table at a stage where a predetermined condition is satisfied.

First Embodiment

Figure 1:
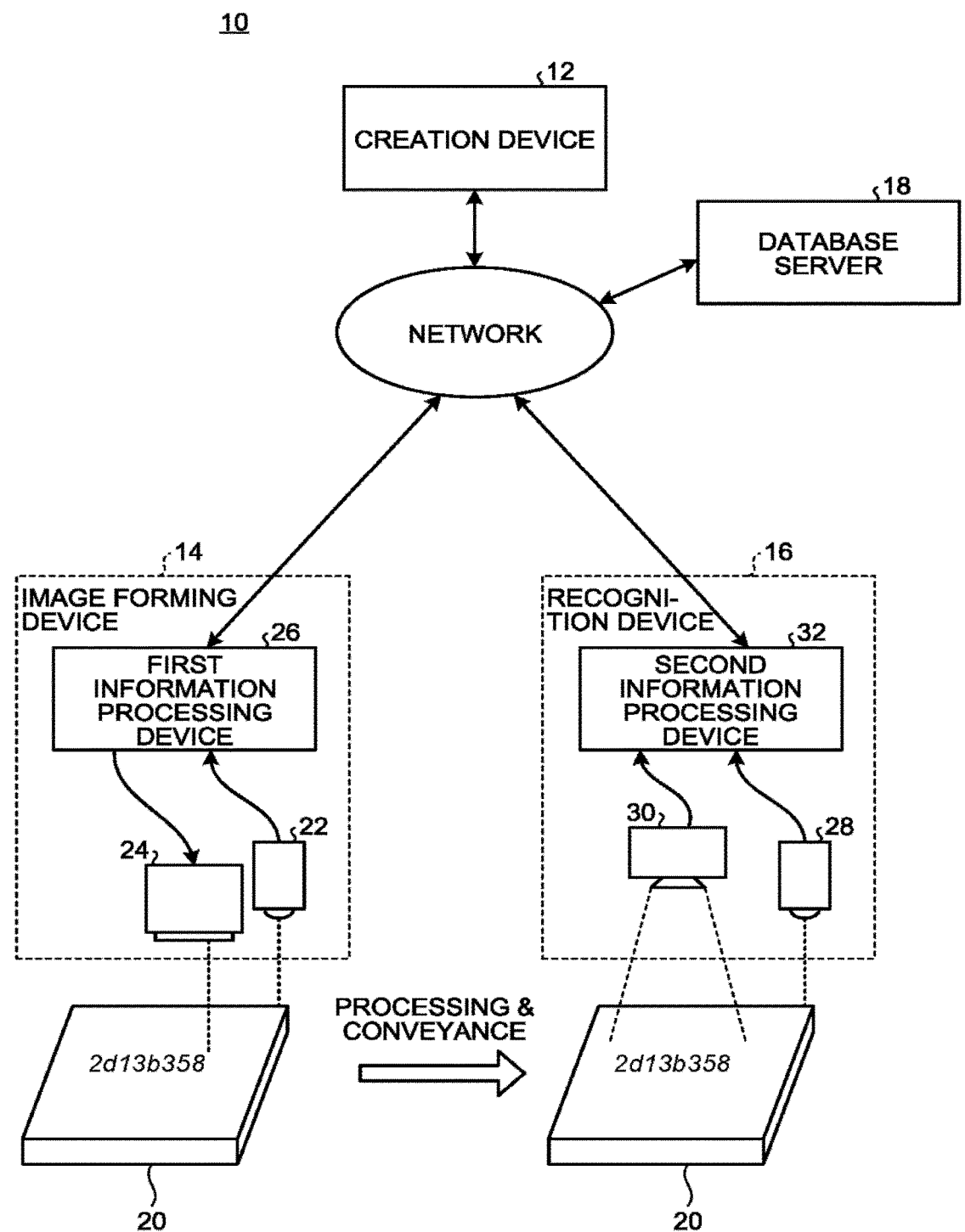
FIG. 1 is a schematic diagram illustrating a recognition system according to a first embodiment.

FIG. 1 is a schematic diagram illustrating a recognition system 10 according to a first embodiment.

The recognition system 10 according to the first embodiment forms, on a surface of an object 20 such as a form or a product, a code image representing a code word that is information for identifying the object 20. After the object 20 is processed or conveyed, for example, the recognition system 10 images the code image formed on the surface of the object 20, performs recognition processing on the taken image, and identifies the code word included in the code image. As a result, the recognition system 10 can identify, track, manage, or search for the object 20 having been processed or conveyed, for example.

The recognition system 10 includes a creation device 12, an image forming device 14, a recognition device 16, and a database server 18.

The creation device 12 creates a code table including a plurality of different code words. The code table will be described in detail later with reference to FIGS. 3 and 4, for example.

The creation device 12 provides the created code table to the image forming device 14 and the recognition device 16. The creation device 12 may transmit the code table to the image forming device 14 and the recognition device 16. The creation device 12 may record the code table in a recording medium and cause the image forming device 14 and the recognition device 16 to read the code table.

The image forming device 14 receives the object 20. For example, the image forming device 14 receives the object 20 conveyed by a conveyance device. At timing when the object 20 is placed at a certain location, the image forming device 14 selects the code word to be allocated for the object 20 from the code table created by the creation device 12. The image forming device 14 forms a code image representing the selected code word at a certain position on the object 20.

For example, the image forming device 14 prints the code image representing the selected code word at the certain position on the object 20. In this case, the image forming device 14 includes a first sensing device 22, a printing device 24, and a first information processing device 26. The first sensing device 22 detects that the object 20 is placed at the certain location. The printing device 24 prints the code image representing the code word provided from the first information processing device 26 at the certain position on the surface of the object 20.

The first information processing device 26, which is a computer, for example, executes a certain application program to control the first sensing device 22 and the printing device 24. The first information processing device 26 preliminarily receives the code table from the creation device 12, and stores therein the received code table. At a timing when the first sensing device 22 detects that the object 20 is placed at the certain location, the first information processing device 26 selects the code word to be allocated for the object 20 from the code table, and causes the printing device 24 to print the code image representing the selected code word at the certain position on the surface of the object 20.

The image forming device 14 may include, instead of the printing device 24, a cutting device that engraves the surface of the object 20, for example. In this case, the cutting device forms ridges and valleys that represent the code word on the surface of the object 20 by laser, for example. The image forming device 14 can also form the code image representing the code word on the object 20 using such a cutting device.

The recognition device 16 receives the object 20 on which the code image has been formed. For example, the recognition device 16 receives the object 20 conveyed by the conveyance device. At timing when the object 20 is placed at a certain imaging position, the recognition device 16 images the code image formed on the object 20. The recognition device 16 performs character recognition processing on the code image taken by the imaging and acquires a character string serving as a recognition result. The recognition device 16 identifies the code word represented by the code image on the basis of the recognition result of the character recognition of the code image, the code table created by the creation device 12, and a confusion matrix preliminarily created.

The code table used by the image forming device 14 and the code table used by the recognition device 16 are identical to each other. The confusion matrix will be described in detail later with reference to FIG. 11, for example.

The recognition device 16 includes a second sensing device 28, an imaging device 30, and a second information processing device 32, for example. The second sensing device 28 detects that the object 20 is placed at the certain imaging position. The imaging device 30 images a certain position on the surface of the object 20.

The second information processing device 32, which is a computer, for example, executes a certain application program to control the second sensing device 28 and the imaging device 30. The second information processing device 32 preliminarily stores therein the code table and the confusion matrix. At timing when the second sensing device 28 detects that the object 20 is placed at the certain imaging position, the second information processing device 32 causes the imaging device 30 to image the certain position of the surface of the object 20, and acquires the code image. The second information processing device 32 performs the character recognition processing on the code image and acquires a character string serving as a recognition result. The second information processing device 32 identifies the code word represented by the code image on the basis of the recognition result, the code table, and the confusion matrix.

The database server 18 acquires the identified code word, for example, from the recognition device 16 via a network, and stores it therein.

Figure 2:
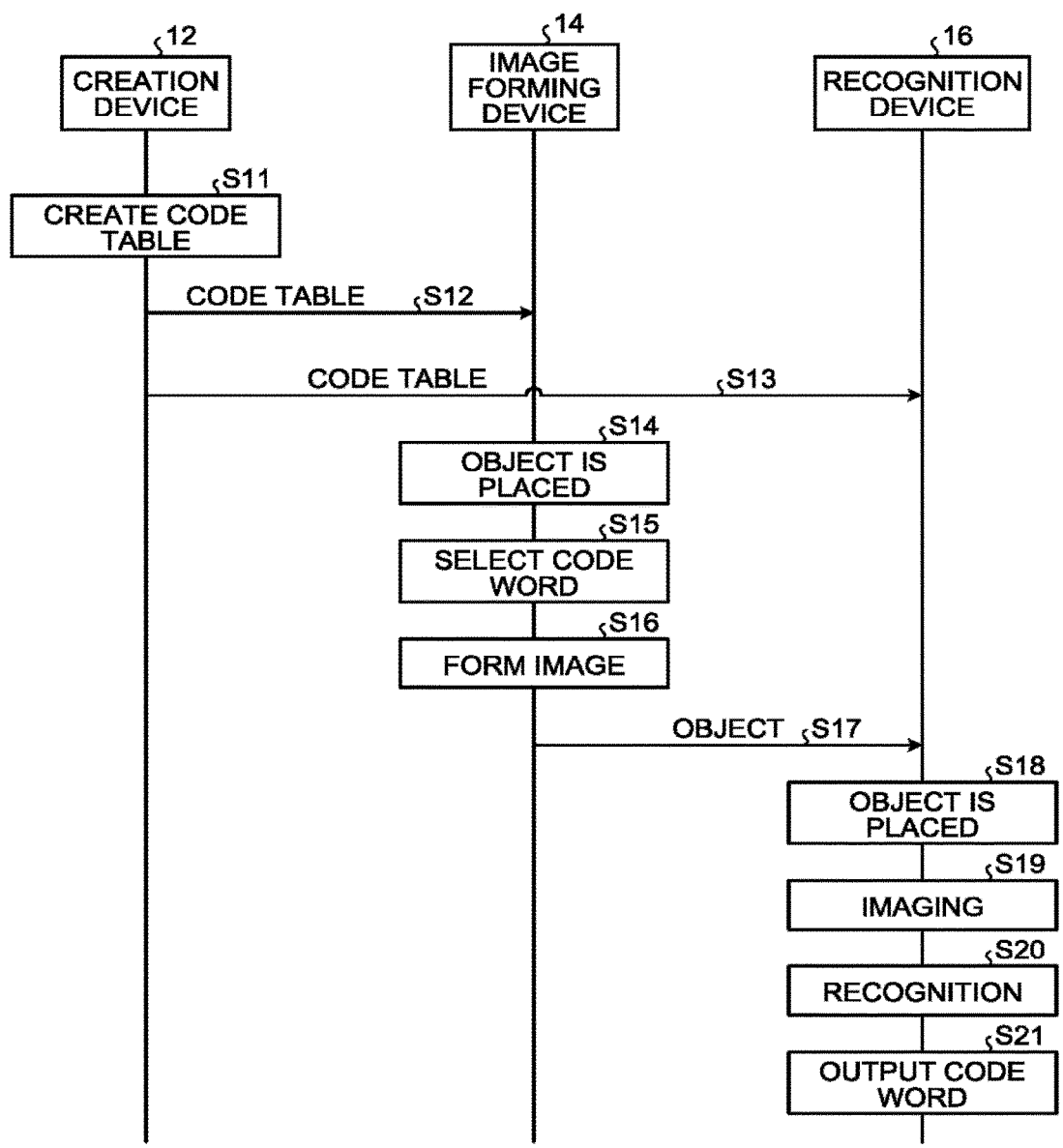
FIG. 2 is a sequence diagram illustrating a sequence of processing in the recognition system.

FIG. 2 is a sequence diagram illustrating a sequence of processing in the recognition system 10. The recognition system 10 performs the processing according to the sequence illustrated in FIG. 2, for example.

The creation device 12 creates the code table (S11). The creation device 12 provides the created code table to the image forming device 14 and the recognition device 16 (S12 and S13).

The image forming device 14 detects that the object 20 is placed at the certain location (S14). The image forming device 14 selects the code word to be allocated for the object 20 placed at the certain location from the code table (S15). The image forming device 14 forms the code image representing the selected code word on the surface of the object 20 (S16). The image forming device 14 repeats the processing from S14 to S16 every time a new object 20 is placed at the certain location.

The object 20 on which the code image has been formed is moved to the recognition device 16 (S17).

The recognition device 16 detects that the object 20 is placed at the certain imaging position (S18). The recognition device 16 images the certain position on the surface of the object 20 and acquires the code image (S19). The recognition device 16 performs the recognition processing on the acquired code image and identifies the code word represented by the code image (S20). The recognition device 16 outputs the identified code word (S21). The recognition device 16 transmits the identified code word to the database server 18, for example. The recognition device 16 repeats the processing from S18 to S21 every time a new object 20 is placed at the certain imaging position.

FIG. 3 is a schematic diagram illustrating an example of the code table. FIG. 4 is a schematic diagram illustrating an example of a character set.

The code table includes a plurality of different code words. The code table includes m number of code words (m is an integer equal to or larger than two). The code table stores therein the code words in such a manner that each code word corresponds to one of the numbers (code indexes) from the first to the mth number, for example. The code table may be an array, for example.

Each code word is a string of a plurality of characters selected from a predetermined character set. The code word is a string of n number of predetermined characters (n is an integer equal to or larger than two), for example. The characters included in the character set may be numbers, letters from the alphabet, hiragana (Japanese characters), kanji (Chinese characters adapted for Japanese), or a combination of these. As illustrated in FIG. 4, the character set may include numbers from zero to nine and alphabets of a, b, c, d, e, and f, for example.

Each of the characters included in the character set is expressed as $S(i)$.

i is the number (character index) designating the character in the character set, and an integer equal to or larger than one and equal to or smaller than z. z is the number of characters included in the character set. For example, in the character set illustrated in FIG. 4, $S(1)=0$, $S(2)=1$, $S(3)=2$, ..., $S(15)=e$, and $S(16)=f$.

The jth code word in the code table is expressed as $A(j)$.

$$A(j)=S(a(j,1)), S(a(j,2)), S(a(j,3)), \ldots, S(a(j,n)).$$

j is the code index and is an integer equal to or larger than one and equal to or smaller than m. $a(j,k)$ is the character index that designates the kth character in the character set of the jth code word in the code table (k is an integer equal to or larger than one and equal to or smaller than n).

Figure 5:
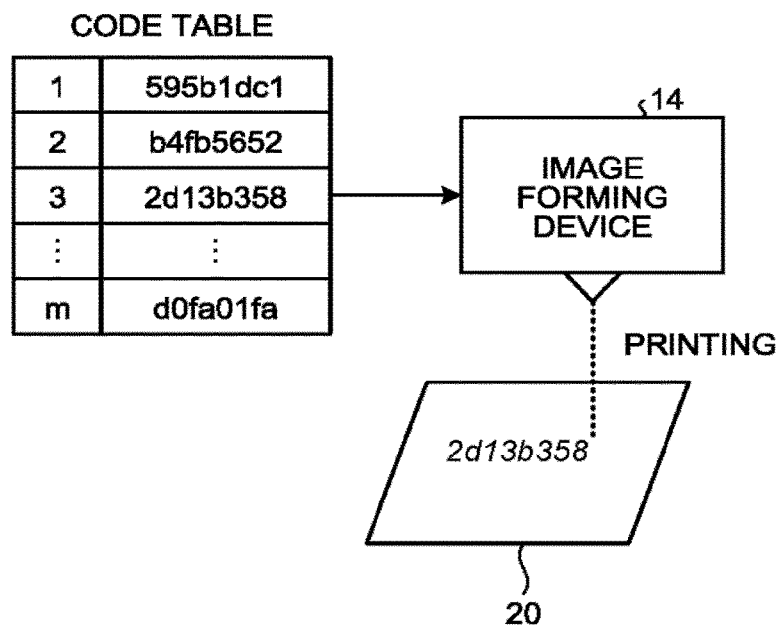
FIG. 5 is a schematic diagram illustrating a state where an image forming device prints a code word selected from the code table.

FIG. 5 is a schematic diagram illustrating a state where the image forming device 14 prints the code word selected from the code table. The image forming device 14 includes a counter, for example. The image forming device 14 increments the value of the counter by one every time the object 20 is placed at the certain location. The image forming device 14 acquires, from the code table, the code word corresponding to the code index coinciding with the value of the counter. The image forming device 14 prints the code image representing the acquired code word on the object 20. In this way, the image forming device 14 can form the code images representing the different code words on the respective objects 20.

Figure 6:
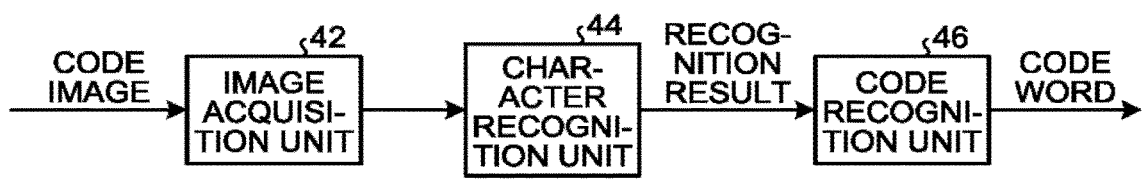
FIG. 6 is a schematic diagram illustrating a functional structure of a recognition device.

FIG. 6 is a schematic diagram illustrating a functional structure of the second information processing device 32 of the recognition device 16. The second information processing device 32 of the recognition device 16 includes an image acquisition unit 42, a character recognition unit 44, and a code recognition unit 46.

The image acquisition unit 42 acquires the code image taken by the imaging device 30. The character recognition unit 44 recognizes the character string included in the code image using optical character recognition processing. The character recognition unit 44 provides the character string serving as the recognition result to the code recognition unit 46. The recognition result as a result of the recognition by the character recognition unit 44 can include errors.

The code recognition unit 46 identifies the code word represented by the code image on the basis of the recognition result of character recognition of the code image, the code table, and the confusion matrix preliminarily created. The code recognition unit 46 outputs the identified code word. The code recognition unit 46 will be described in detail later with reference to FIG. 10, for example.

Figure 7:
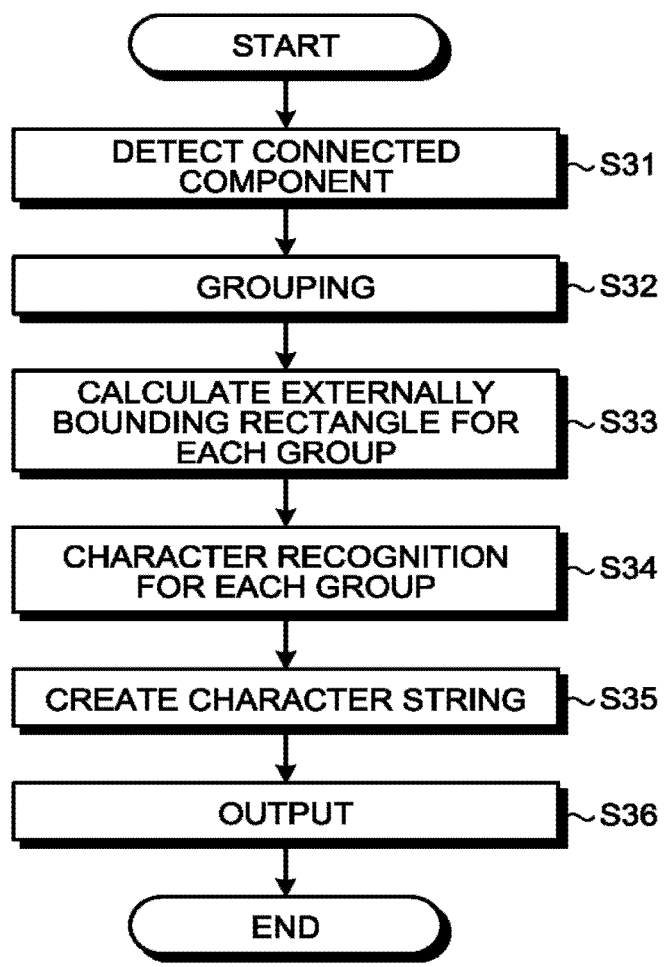
FIG. 7 is a flowchart of character recognition processing.
Figure 8:
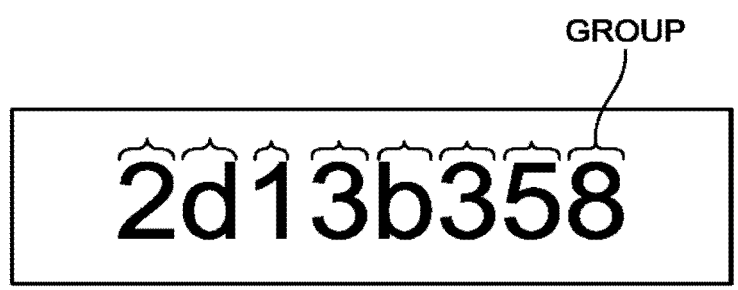
FIG. 8 is a schematic diagram illustrating exemplary connected component groups.
Figure 9:
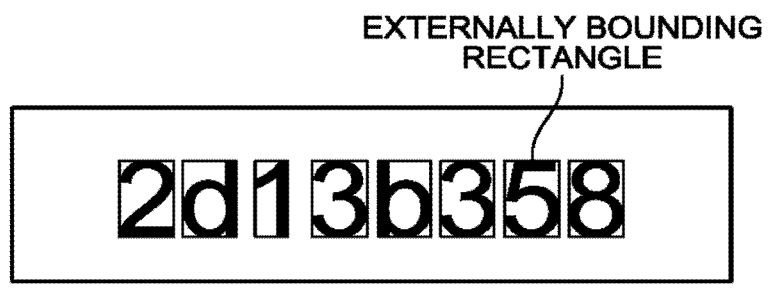
FIG. 9 is a schematic diagram illustrating exemplary externally bounding rectangles.

FIG. 7 is a flowchart illustrating an example of the character recognition processing performed by the character recognition unit 44. FIG. 8 is a schematic diagram illustrating exemplary connected component groups. FIG. 9 is a schematic diagram illustrating exemplary externally bounding rectangles.

The character recognition unit 44 performs the recognition processing on the code image in accordance with the flowchart illustrated in FIG. 7, for example. The character recognition unit 44 detects a connected component (region) composed of connected pixels (e.g., black pixels) constituting the character from the code image (S31).

The character recognition unit 44 groups, out of the connected components, the connected components between which the distance is equal to or smaller than a predetermined threshold (S32). For example, the character recognition unit 44 groups the connected components as illustrated in FIG. 8.

The character recognition unit 44 calculates a rectangle (externally bounding rectangle) externally tangent to the black pixels for each group (S33). For example, the character recognition unit 44 calculates the externally bounding rectangle for each group as illustrated in FIG. 9.

The character recognition unit 44 performs the recognition processing on the inside of the externally bounding rectangle for each group using a subspace method, for example, and acquires the character inside the externally bounding rectangle (S34). The character recognition unit 44 arranges the characters acquired from the respective groups in a certain direction to create a character string composed of a plurality of characters (S35). The character recognition unit 44 outputs the created character string to the code recognition unit 46 as the recognition result (S36).

Figure 10:
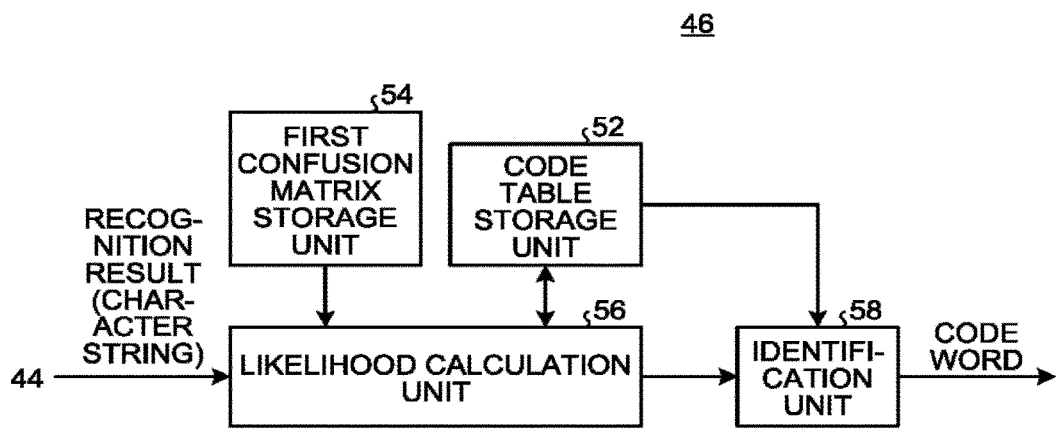
FIG. 10 is a schematic diagram illustrating a functional structure of a code recognition unit.

FIG. 10 is a schematic diagram illustrating a functional structure of the code recognition unit 46. The code recognition unit 46 includes a code table storage unit 52, a first confusion matrix storage unit 54, a likelihood calculation unit 56, and an identification unit 58.

The code table storage unit 52 stores therein the code table preliminarily created by the creation device 12. The first confusion matrix storage unit 54 stores therein the confusion matrix preliminarily created. The confusion matrix is described later with reference to FIG. 11.

The likelihood calculation unit 56 acquires, from the character recognition unit 44, the recognition result, which is the character string as the result of character recognition of the code image formed on the object 20. The likelihood calculation unit 56 calculates a likelihood of each of the multiple code words included in the code table using the confusion matrix in relation to the recognition result. The likelihood calculation unit 56 may calculate a logarithmic likelihood of each of the multiple code words included in the code table in relation to the recognition result.

The identification unit 58 identifies the code word having the largest likelihood in relation to the recognition result out of the multiple code words included in the code table on the basis of the likelihoods calculated by the likelihood calculation unit 56. For example, the identification unit 58 identifies the code word having the smallest logarithmic likelihood in relation to the recognition result out of the multiple code words included in the code table. The identification unit 58 outputs the identified code word.

Figure 11:
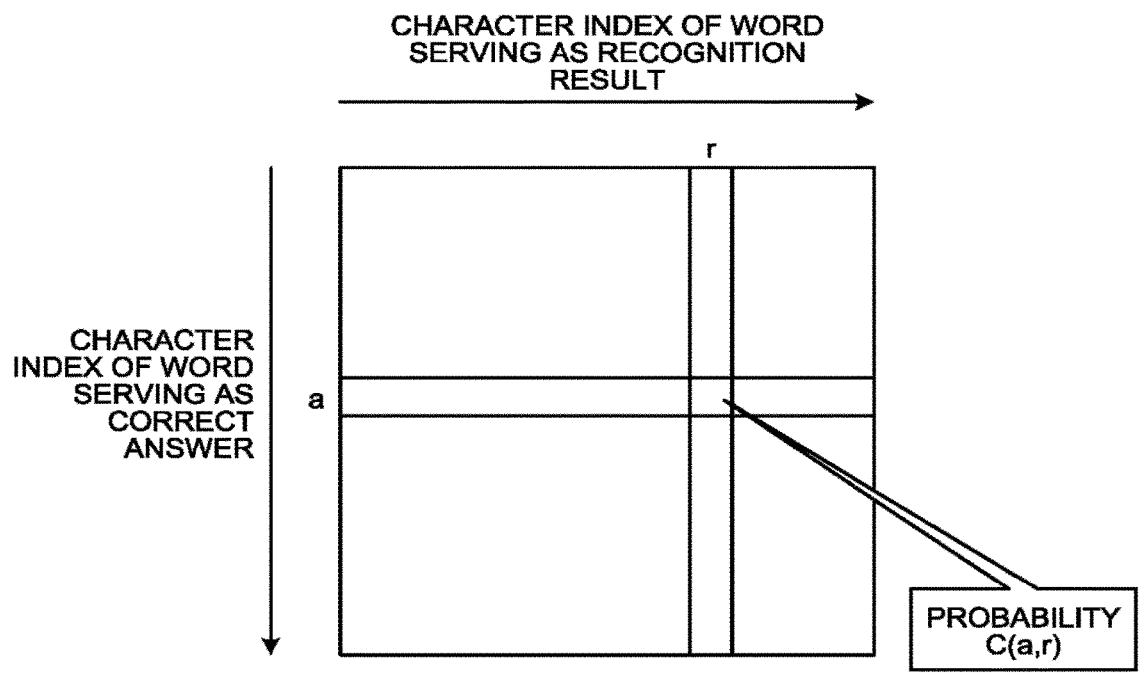
FIG. 11 is a schematic diagram illustrating an arrangement of elements of a confusion matrix.

FIG. 11 is a schematic diagram illustrating an arrangement of elements of the confusion matrix. The confusion matrix represents the probabilities that the characters represented by an image are recognized as the respective characters included in a character set, when the image forming device 14 forms, on the object 20, the image representing the characters included in the character set, and the recognition device 16 performs character recognition on the image formed on the object 20.

The confusion matrix is calculated in such an exemplary manner that the image forming device 14 actually forms a large number of characters on the object 20 preliminarily and the recognition device 16 actually recognizes the respective characters. The confusion matrix may be calculated by simulating the forming processing and the recognition processing, or estimated from the shapes of the respective characters, for example.

The confusion matrix may be a square matrix having n rows and n columns, n being the number of multiple characters included in the character set, for example. In the confusion matrix, each row corresponds to a character index (a) representing a character serving as a correct answer while each column corresponds to a character index (r) representing a character serving as a recognition result, for example.

The element at the ath row and the rth column in the confusion matrix is expressed as $C(a,r)$. $C(a,r)$ represents a probability that a first image representing a character $S(a)$ designated by the character index (a) formed on the object 20 by the image forming device 14 is recognized as a character $S(r)$ designated by the character index (r) when the recognition device 16 performs the character recognition on the first image formed on the object 20.

The likelihood calculation unit 56 calculates the likelihood of each of the multiple code words included in the code table in relation to the recognition result. Specifically, the likelihood calculation unit 56 calculates the likelihood $L(j)$ of the jth code word $A(j)=S(a(j,1)), S(a(j,2)), \ldots, S(a(j,n))$ in relation to the recognition result $R=r(1), r(2), \ldots, r(n)$ by the following expression (1).

$$L(j)=C(a(j,1),r(1))C(a(j,2),r(2)) \ldots C(a(j,n),r(n)) \quad (1)$$

The likelihood calculation unit 56 acquires, from the confusion matrix, the probability that the character included in the recognition result is the corresponding character serving as a correct answer in the jth code word for each character included in the recognition result, multiplies all of the acquired probabilities to calculate the likelihood of the jth code word in relation to the recognition result.

The likelihood calculation unit 56 may calculate the logarithmic likelihood. In this case, the likelihood calculation unit 56 calculates the logarithmic likelihood $D(j)$ of the jth code word $A(j)=S(a(j,1), S(a(j,2)), \ldots, S(a(j,n))$ in relation to the recognition result $R=r(1), r(2), \ldots, r(n)$ by the following expression (2).

$$D(j)=-\ln C(a(j,1),r(1))-\ln C(a(j,2),r(2))- \ldots -\ln C(a(j,n),r(n)) \quad (2)$$

The likelihood calculation unit 56 acquires, from the confusion matrix, the probability that the character included in the recognition result is the corresponding character serving as a correct answer in the jth code word for each character included in the recognition result, multiplies the logarithmic value of the acquired probability by minus one for each acquired probability, and adds all of the logarithmic values after multiplication to calculate the logarithmic likelihood of the jth code word in relation to the recognition result. When the logarithmic likelihood is calculated, the confusion matrix may store therein the logarithmic value of the probability for each element.

Figure 12:
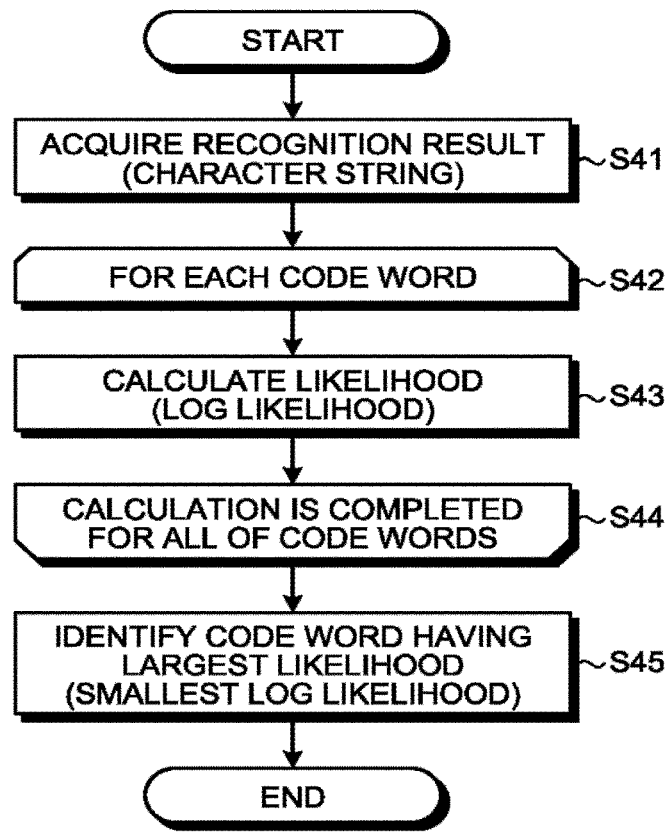
FIG. 12 is a flowchart of code recognition processing.

FIG. 12 is a flowchart illustrating the code recognition processing performed by the code recognition unit 46. The code recognition unit 46 performs the code recognition processing in accordance with the flowchart illustrated in FIG. 12, for example.

At S41, the code recognition unit 46 acquires the character string serving as a recognition result from the character recognition unit 44. The code recognition unit 46 performs the processing at S43 (loop processing between S42 and S44) for each code word included in the code table. At S43, the code recognition unit 46 calculates the likelihood of the target code word in relation to the recognition result using the confusion matrix. Specifically, the code recognition unit 46 calculates the likelihood by expression (1) described above. Instead of the likelihood, the code recognition unit 46 may calculate the logarithmic likelihood by expression (2) described above.

When the processing at S43 is performed on all of the code words, the code recognition unit 46 causes the processing to proceed to S45. At S45, the code recognition unit 46 identifies the code word having the largest likelihood out of the multiple code words included in the code table, and outputs the identified code word. When calculating the logarithmic likelihood, the code recognition unit 46 identifies the code word having the smallest logarithmic likelihood out of the multiple code words included in the code table, and outputs the identified code word.

Figure 13:
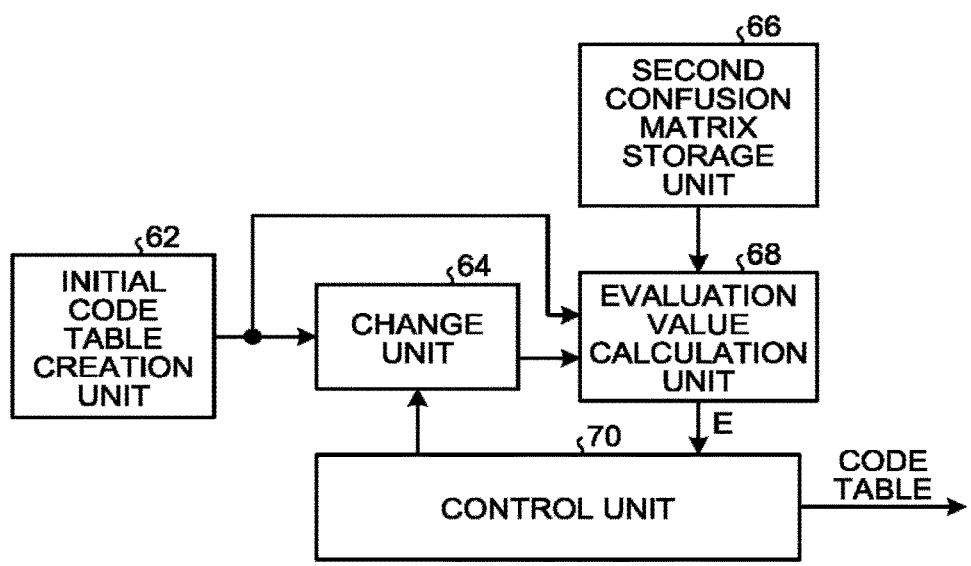
FIG. 13 is a schematic diagram illustrating a functional structure of a creation device.

FIG. 13 is a schematic diagram illustrating a functional structure of the creation device 12. The creation device 12 includes an initial code table creation unit 62, a change unit 64, a second confusion matrix storage unit 66, an evaluation value calculation unit 68, and a control unit 70.

The initial code table creation unit 62 creates an initial code table. For example, the initial code table creation unit 62 randomly selects characters from the character set and creates a plurality of code words. The initial code table creation unit 62 creates an initial code table including the created multiple code words. The initial code table creation unit 62 may output a pre-registered code table as an initial code table.

The change unit 64 creates a new code table by changing the code table. At the first time, the change unit 64 changes the initial code table created by the initial code table creation unit 62 to create a new code table, for example. From the second time onwards, the change unit 64 changes the code table changed at the previous time to create a new code table. In this case, the change unit 64 changes the code table such that the changed code table is not identical with the code tables created in the past.

In the first embodiment, the change unit 64 changes the characters included in some of code words included in the code table to create a new code table. For example, the change unit 64 changes a single character included in a single code word included in the code table to create a new code table.

The second confusion matrix storage unit 66 stores therein the confusion matrix preliminarily created. The second confusion matrix storage unit 66 stores therein the confusion matrix identical to the confusion matrix stored by the recognition device 16.

The evaluation value calculation unit 68 calculates an evaluation value for each of the initial code table created by the initial code table creation unit 62 and the code table changed by the change unit 64 using the confusion matrix. The evaluation value represents a possibility that the code word included in the code table is wrongly recognized. The code table having a smaller evaluation value than that of another code table can reduce false recognition by the recognition device 16 when the code table is actually used.

An evaluation value calculation method is described in detail later.

The control unit 70 causes the change unit 64 to repeat the change of the code table and the evaluation value calculation unit 68 to repeat the calculation of the evaluation value such that the evaluation value becomes small. For example, the control unit 70 causes the change unit 64 and the evaluation value calculation unit 68 to perform the processing such that the evaluation value becomes small using hill climbing method.

Specifically, the control unit 70 confirms the change of the code table when the evaluation value of the changed code table is smaller than the evaluation value of the code table before the change, and causes the change unit 64 to further change the changed code table. When the evaluation value of the changed code table is not smaller than the evaluation value of the code table before the change, the control unit 70 cancels the change of the code table, and causes the change unit 64 to change the code table again. In this way, the control unit 70 can cause the change unit 64 to change the code table such that the evaluation value becomes small.

The control unit 70 outputs the code table when a predetermined condition is satisfied. For example, the control unit 70 outputs the code table when a reduction of the evaluation value stops. More specifically, the control unit 70 outputs the code table having the smallest evaluation value when the evaluation value is not reduced after changing the code table a number of times equal to or larger than the predetermined number of times. The control unit 70 may forcibly end the processing when the code table is changed during a period of time equal to or larger than a certain time, and output the code table having the smallest evaluation value at the time.

Figure 14:
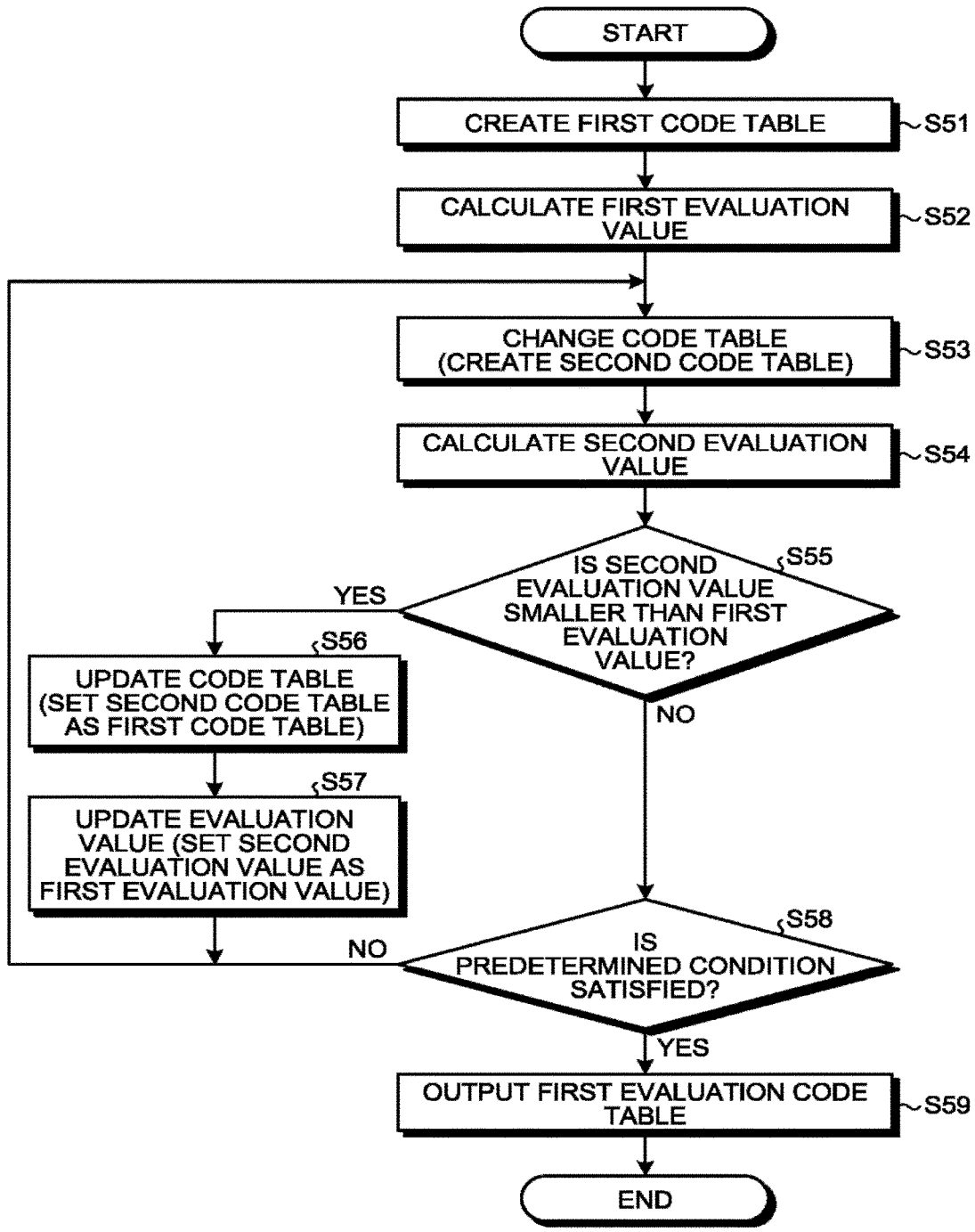
FIG. 14 is a flowchart illustrating the processing performed by the creation device according to the first embodiment.

FIG. 14 is a flowchart illustrating the processing performed by the creation device 12 according to the first embodiment. The creation device 12 according to the first embodiment creates the code table in accordance with the flowchart illustrated in FIG. 14.

At S51, the initial code table creation unit 62 creates a first code table in an initial stage. At S52, the evaluation value calculation unit 68 calculates the evaluation value (first evaluation value) of the first code table using the confusion matrix.

At S53, the change unit 64 changes a part of the first code table to create a second code table. For example, the change unit 64 changes a single character included in a single code word included in the first code table.

At S54, the evaluation value calculation unit 68 calculates the evaluation value (second evaluation value) of the second code table using the confusion matrix. At S55, the control unit 70 determines whether the second evaluation value is smaller than the first evaluation value. If the second evaluation value is smaller than the first evaluation value, that is, the code table has been changed such that the evaluation value becomes small (Yes at S55), the control unit 70 causes the processing to proceed to S56. If the second evaluation value is not smaller than the first evaluation value, that is, the code table has not been changed such that the evaluation value becomes small (No at S55), the control unit 70 causes the processing to proceed to S58.

At S56, the control unit 70 sets the second code table as the first code table. That is, the control unit 70 sets one code table having an evaluation value smaller than that of the other code table as the first code table. At S57, the control unit 70 sets the second evaluation value as the first evaluation value. The control unit 70 causes the processing to return to S53, from which the processing is repeated. In this way, when the evaluation value of the changed code table is smaller than the evaluation value of the code table before the change, the control unit 70 confirms the change of the code table and can cause the change unit 64 to further change the changed code table.

At S58, the control unit 70 determines whether a predetermined condition is satisfied. For example, the control unit 70 determines whether the evaluation value is not reduced by changing the first code table a number of times equal to or larger than a predetermined number of times. If the predetermined condition is not satisfied (No at S58), the control unit 70 performs no processing, causes the processing to return to S53, from which the processing is repeated.

When the evaluation value of the changed code table is not smaller than the evaluation value of the code table before the change, the control unit 70 cancels the change of the code table, and can cause the change unit 64 to change the code table again.

If the predetermined condition is satisfied (Yes at S58), the control unit 70 causes the processing to proceed to S59. At S59, the control unit 70 outputs the first code table which is the code table having the smallest evaluation value at this time.

As a result of the processing described above, the creation device 12 can create the code table that reduces false recognition by the recognition device 16. The recognition system 10 according to the first embodiment, thus, can recognize the code word formed on the object 20 highly accurately.

Evaluation Value

The following further describes the evaluation value.

The evaluation value represents a possibility that the code word included in the code table is wrongly recognized. More specifically, the evaluation value represents the possibility that the code image is wrongly recognized when the image forming device 14 forms the code images representing the respective code words included in the code table on the object 20 and the recognition device 16 performs the character recognition on the code image formed on the object 20.

The evaluation value calculation unit 68 of the creation device 12 calculates the evaluation value by the following expression (11).

$$E = \sum_{j=1}^{m} E(j) \qquad (11)$$

where E is the evaluation value of the code table, j is an integer from one to m, and is the number designating the code word included in the code table, m is the number of code words included in the code table, and E(j) is an individual evaluation value of the jth code word A(j) in the code table.

The creation device 12 calculates, as the evaluation value, the value of the sum of the individual evaluation values of the respective code words included in the code table.

The individual evaluation value is an approximate value of the probability that the recognition device 16 identifies a code word different from the corresponding code word in the code table. More specifically, the individual evaluation value represents an approximate value of the possibility that a code word different from the corresponding code word is identified when the image forming device 14 forms the code image representing the corresponding code word on the object 20, the recognition device 16 performs the character recognition on the code image formed on the object 20, and the code word is identified from the recognition result obtained by the character recognition.

The evaluation value calculation unit 68 of the creation device 12 calculates the individual evaluation value by the following expression (12).

$$E(j) = \sum_{h=1, h \neq j}^{m} E(j,h) \qquad (12)$$

where h represents an integer from one to m, and is the number designating the code word included in the code table. And, E(j,h) represents the approximate value of the possibility that the logarithmic likelihood of the jth code word in relation to the recognition result is larger than the logarithmic likelihood of the hth code word in relation to the recognition result when the image forming device 14 forms the code image representing the jth code word on the object 20 and the recognition device 16 performs the character recognition on the code image.

More specifically, E(j,h) is expressed by the following expression (13).

$$E(j,h) \equiv P(D(h) < D(j)) \tag{13}$$

where D(j) is the logarithmic likelihood of the jth code word included in the code table in relation to the recognition result when the image forming device 14 forms the code image representing the jth code word on the object 20 and the recognition device 16 performs the character recognition on the code image, D(h) is the logarithmic likelihood of the hth code word included in the code table in relation to the recognition result when the image forming device 14 forms the code image representing the jth code word on the object 20 and the recognition device 16 performs the character recognition on the code image, and P(D(h)<D(j)) is the probability that D(h) is smaller than D(j).

As for the three arbitrary code words A(j), A(h), and A(g) included in the code table, the probability that "D(h)<D(j)" and "D(g)<D(j)" is not zero. The creation device 12 according to the first embodiment, however, calculates E(j) on the assumption that the probability that "D(h)<D(j)" and "D(g) <D(j)" is significantly small. The creation device 12, thus, calculates, as E(j), an approximate value instead of a true value of the probability that a different code word is selected.

The following further describes the specific calculation method of E.

By substituting expression (12) expressing E(j) into expression (11) expressing E, the following expression (14) is obtained.

$$E \equiv \sum_{j=1}^{m} E(j) \tag{14}$$
$$= \sum_{j=1}^{m} \sum_{h=1, h \neq j}^{m} E(j, h)$$

E(j,h) is also expressed by the following expression (15).

$$E(j, h) \equiv P(D(h) < D(j)) \tag{15}$$
$$= P(D(h) - D(j) < 0)$$

d(h,j) is defined as expressed by the following expression (16).

$$d(h,j) \equiv D(h) - D(j) \tag{16}$$

Using the definition expressed by expression (16), expression (15) is modified to the following expression (17).

$$E(j,h) = P(d(h,j) < 0) \tag{17}$$

d(k,h,j) is defined as expressed by the following expression (18).

$$d(k,h,j) \equiv \ln C(a(j,k), r(k)) - \ln C(a(h,k), r(k)) \tag{18}$$

By substituting formula (18) into formula (16), the following formula (19) is obtained.

$$d(h, j) \equiv D(h) - D(j) \tag{19}$$
$$= (-\ln C(a(h, 1), r(1)) - \ldots - \ln C(a(h, n), r(n))) -$$
$$(-\ln C(a(j, 1), r(1)) - \ldots - \ln C(a(j, n), r(n)))$$

-continued
$$= (\ln C(a(j, 1), r(1)) - \ln C(a(h, 1), r(1))) + \ldots +$$
$$(\ln C(a(j, n), r(n)) - \ln C(a(h, n), r(n)))$$
$$= d(1, h, j) + d(2, h, j) + \ldots + d(n, h, j)$$

A probability density function of the sum of independent probability variables is calculated by convolutional integration of original probability density functions. In the first embodiment, characters S(r(l)), S(r(2)), . . . , and S(r(n)) serving as a recognition result are supposed to be independent from one another. In the first embodiment, probability variables d(1,h,j), d(2,h,j), . . . , and d(n,h,j) are supposed to be independent from one another.

The probability density function of d(h,j), that is, p (d(h,j)=x), is expressed by the following expression (20).

$$p(d(h,j)=x)=p(d(1,h,j)=x)*p(d(2,h,j)=x)* \ldots *p(d(n,h,j)=x) \tag{20}$$

where * represents convolutional integration between the expressions on the left side and the right side of *.

The evaluation value calculation unit 68 of the creation device 12 can calculate E(j,h)=P(d(h,j)<0) by integrating the probability density function expressed in expression (20) in a range of d(h,j)<0.

The probability density function p(d(k,h,j)=x) is expressed by the following expression (21) using a Dirac delta function δ(●).

$$p(d(k,h,j)=x)=\Sigma_{s=1}^{z} C(a(j,k),s)\delta(x-(\ln C(a(j,k),s)-\ln C(a(h,k),s)) \tag{21}$$

The probability density function p(d(k,h,j)=x) and the probability density function p(d(h,j)=x) are continuous functions of the variable x, and cannot be handled by a computer. The evaluation value calculation unit 68 of the creation device 12 handles the probability density function p(d (k,h,j)=x) and the probability density function p(d(h,j)=x) as arrays by setting a lower limit value $x_{min}$ and an upper limit value $x_{max}$ for the variable x and a quantized class number $n_x$.

Let the probability density function expressed by an array be p(x), the element P(α) at the αth in the array is expressed by the following expression (22) where α is an integer equal to or larger than one.

$$P(\alpha) = \int_{x_{min}+(\alpha-1) \cdot \frac{x_{max}-x_{min}}{n_x}}^{x_{min}+\alpha \cdot \frac{x_{max}-x_{min}}{n_x}} p(x) dx \tag{22}$$

The element P(α;d(k,h,j)) at the αth in the array representing the probability density function p(d(k,h,j)=x) is, thus, expressed by the following expression (23).

$$\sum_{(s \in \{1,\ldots,Z\}) \wedge \left[ (\alpha-1) \cdot \frac{x_{max}-x_{min}}{n_x} \leq \ln C(a(j,k),s) - \ln C(a(h,k),s) < \alpha \cdot \frac{x_{max}-x_{min}}{n_x} \right]} C(a(j,k), s)) \tag{23}$$

The evaluation value calculation unit 68 of the creation device 12 can calculate P(α;d(k,h,j)) by performing the following first to fourth steps.

At the first step, the evaluation value calculation unit 68 initializes P(α;d(k,h,j)) (α=1, . . . , $n_x$) to zero.

At the second step, the evaluation value calculation unit 68 performs the following third and fourth steps where s=1, ..., and Z.

At the third step, the evaluation value calculation unit 68 substitutes the value expressed by the following expression (24) into α.

$$\left\lfloor \frac{\ln c(a(j,k),s)) - \ln c(a(h,k),s)) - x_{min}}{n_x} \right\rfloor \quad (24)$$

At the fourth step, the evaluation value calculation unit 68 adds C(a((j,k),s)) to P(α;d(k,h,j)).

The evaluation value calculation unit 68 can calculate the array expressing the probability density function p(d(k, h,j)=x) by performing the processing described above.

The convolutional integration of the probability density function p(x) and the probability density function q(x) is expressed by the following expression (25).

$$(p*q)(x) = \int_{-\infty}^{+\infty} p(y)q(x-y)dy \quad (25)$$

The evaluation value calculation unit 68 of the creation device 12 calculates the convolutional integration of p(x) expressed by the array and q(x) expressed by the array by the following expression (26).

$$(P*Q)(\alpha) = \Sigma_{\beta=1, 1 \le \alpha-\beta \le n_x}{}^{n_k} P(\beta)Q(\alpha-\beta) \quad (26)$$

The evaluation value calculation unit 68 of the creation device 12 can calculate the evaluation value of the code table by performing the calculations described above.

Second Embodiment

The following describes the recognition system 10 according to a second embodiment. The recognition system 10 according to the second embodiment has substantially the same functions and structure as the first embodiment, but differs from that in the first embodiment in that the code table creation method is different. In the second embodiment, the blocks each having substantially the same function and structure as the first embodiment are labeled with the same reference numerals and detailed description thereof are omitted except for different points. A third embodiment is also described in the same manner as described above.

Figure 15:
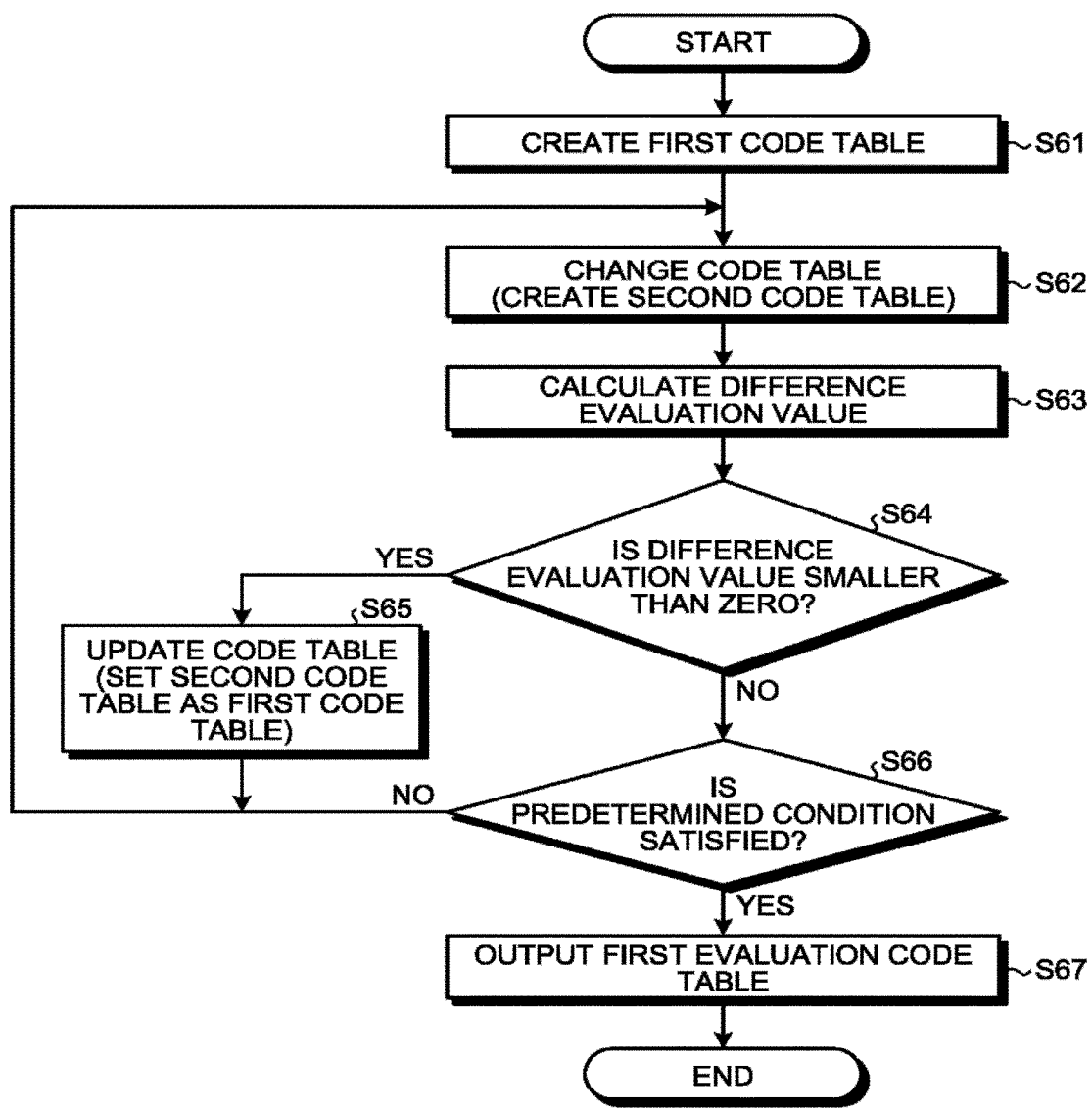
FIG. 15 is a flowchart illustrating the processing performed by the creation device according to a second embodiment.

FIG. 15 is a flowchart illustrating the processing performed by the creation device 12 according to the second embodiment. The creation device 12 according to the second embodiment creates the code table in accordance with the flowchart illustrated in FIG. 15.

At S61, the initial code table creation unit 62 creates the first code table in an initial stage. At S62, the change unit 64 changes a part of the first code table to create the second code table.

At S63, the evaluation value calculation unit 68 calculates a difference evaluation value using the confusion matrix. The difference evaluation value represents a difference between the first evaluation value representing the possibility that the code word included in the changed code table is wrongly recognized and the second evaluation value representing the possibility that the code word included in the code table before the change is wrongly recognized. The specific calculation method of the difference evaluation value is described later.

At S64, the control unit 70 determines whether the difference evaluation value is smaller than zero. The control unit 70 determines whether the second evaluation value is smaller than the first evaluation value.

If the difference evaluation value is smaller than zero, that is, the code table has been changed such that the evaluation value becomes small (Yes at S64), the control unit 70 causes the processing to proceed to S65. If the difference evaluation value is not smaller than zero, that is, the code table has not been changed such that the evaluation value becomes small (No at S64), the control unit 70 causes the processing to proceed to S66.

At S65, the control unit 70 sets the second code table as the first code table. The control unit 70 sets one code table having an evaluation value smaller than that of the other code table as the first code table. The control unit 70 causes the processing to return to S62, from which the processing is repeated. In this way, when the evaluation value of the changed code table is smaller than the evaluation value of the code table before the change, the control unit 70 confirms the change of the code table and can cause the change unit 64 to further change the changed code table.

At S66, the control unit 70 determines whether a predetermined condition is satisfied. For example, the control unit 70 determines whether the evaluation value is not reduced by changing the first code table a number of times equal to or larger than a predetermined number of times. If the predetermined condition is not satisfied (No at S66), the control unit 70 performs no processing, and causes the processing to return to S62, from which the processing is repeated. When the evaluation value of the changed code table is not smaller than the evaluation value of the code table before the change, the control unit 70 cancels the change of the code table, and can cause the change unit 64 to change the code table again.

If the predetermined condition is satisfied (Yes at S66), the control unit 70 causes the processing to proceed to S67. At S67, the control unit 70 outputs the first code table which is the code table having the smallest evaluation value at this time.

As described above, the evaluation value calculation unit 68 according to the second embodiment calculates the difference value using the confusion matrix. The difference evaluation value represents a difference between the first evaluation value representing the possibility that the code word included in the changed code table is wrongly recognized and the second evaluation value representing the possibility that the code word included in the code table before the change is wrongly recognized. The control unit 70 causes the change of the code table and the calculation of the difference evaluation value to be repeated such that the difference evaluation value is smaller than zero. At a stage where a predetermined condition is satisfied, the control unit 70 outputs the code table.

As a result of the processing described above, the creation device 12 can create the code table that reduces false recognition by the recognition device 16. The recognition system 10 according to the second embodiment, thus, can recognize the code word formed on the object 20 highly accurately.

Difference Evaluation Value

The difference evaluation value is expressed as ΔE=($E_{new}$−E). where $E_{new}$ is the first evaluation value that represents a possibility that the code word included in the changed code table is wrongly recognized, and where E is the second evaluation value that represents a possibility that the code word included in the code table before the change is wrongly recognized. ΔE is expressed by the following expression (27) as a result of modification.

$$\Delta E = E_{new} - E \qquad (27)$$

$$= \sum_{b=1}^{m} \sum_{h=1,h\neq b}^{m} E_{new}(b,h) - \sum_{b=1}^{m} \sum_{h=1,h\neq b}^{m} E(b,h)$$

$$= \sum_{b=1}^{m} \sum_{h=1,h\neq b}^{m} (E_{new}(b,h) - E(b,h))$$

$E_{new}(b,h)$ represents the approximate value of the possibility that the logarithmic likelihood of the bth code word in relation to the recognition result is larger than the logarithmic likelihood of the hth code word in relation to the recognition result when the image forming device 14 forms the code image representing the bth code word in the changed code table on the object 20 and the recognition device 16 performs the character recognition on the code image. $E(b,h)$ represents the approximate value of the possibility that the logarithmic likelihood of the bth code word in relation to the recognition result is larger than the logarithmic likelihood of the hth code word in relation to the recognition result when the image forming device 14 forms the code image representing the bth code word in the code table before the change on the object 20 and the recognition device 16 performs the character recognition on the code image.

The difference between $E_{new}(b,h)$ and $E(b,h)$ is caused by the replacement of $a(j,k)$ with $a_{new}(j,k)$ in the kth character of the jth code word in the code table. When both b and h are not equal to j, $E_{new}(b,h)-E(b,h)=0$. As a result, expression (27) is modified to the following expression (28).

$$\Delta E = \sum_{b=1}^{m} \sum_{h=1,h\neq b}^{m} (E_{new}(b,h) - E(b,h)) \qquad (28)$$

$$= \sum_{h=1,h\neq j}^{m} (E_{new}(j,h) - E(j,h)) + \sum_{b=1,b\neq j}^{m} (E_{new}(b,j) - E(b,j))$$

$$= \sum_{h=1,h\neq j}^{m} (E_{new}(j,h) - E(j,h)) + (E_{new}(b,j) - E(b,j))$$

The evaluation value calculation unit 68 of the creation device 12 calculates the difference evaluation value on the basis of expression (28).

The evaluation value calculation unit 68 of the creation device 12 can calculate the difference evaluation value by performing the calculation on the characters before and after the change. The creation device 12 can calculate the difference evaluation value by less calculation than a case where the evaluation value of the code table before the change and the evaluation value of the changed code table are individually calculated.

Third Embodiment

The following describes the recognition system 10 according to a third embodiment. The creation device 12 according to the third embodiment updates a code table set including a plurality of code tables using a genetic algorithm, and creates the code tables each having a smaller evaluation value.

In the third embodiment, the code table is expressed in a vector form. The evaluation value of the code table is fitness of the code table to environment, for example. The creation device 12 can cause the respective code tables to evolve by processing techniques, such as selection processing, crossover processing, and mutation processing, used in the genetic algorithm.

The jth code word in the code table is expressed as follows:

$A(j)=S(a(j,1)),S(a(j,2)), \ldots ,S(a(j,n))$.

The jth code word can be expressed as the arrangement of the character indexes each designating the character in the character set as follows:

$a(j,1)),a(j,2)), \ldots ,a(j,n)$.

The code table, thus, can be expressed in a vector form in which the character indexes from the first code word to the mth code word are arranged as expressed by the following expression (29).

$$T=(a(1,1),a(1,1), \ldots ,a(1,n),a(2,1), \ldots ,a(2,n), \ldots \\ ,a(m,1)a(m,2), \ldots ,a(m,n)) \qquad (29)$$

The creation device 12 creates a code table set ($T_1$, $T_2$, $T_3$, . . . , $T_M$) including a plurality of code tables each expressed in a vector form. The creation device 12 causes the code table set to evolve such that the evaluation values become small using the genetic algorithm and creates the code tables each having a smaller evaluation value.

Figure 16:
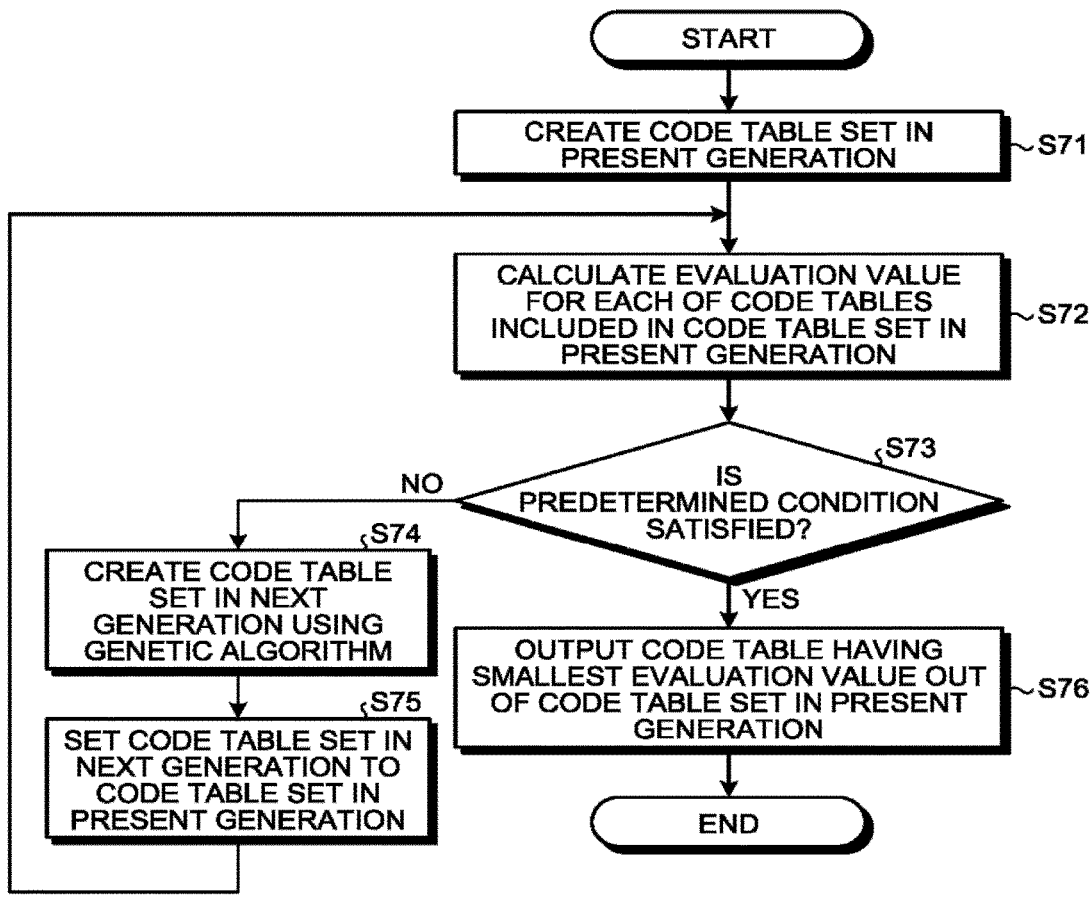
FIG. 16 is a flowchart illustrating the processing performed by the creation device according to a third embodiment.

FIG. 16 is a flowchart illustrating the processing performed by the creation device 12 according to the third embodiment. The creation device 12 according to the third embodiment creates the code table in accordance with the flowchart illustrated in FIG. 16.

At S71, the initial code table creation unit 62 creates a code table set in a first generation and sets the created first generation code table set as a code table set in a present generation. For example, the initial code table creation unit 62 randomly selects characters to create a plurality of code tables, and sets the code table set including the multiple code tables as the first generation code table set.

At S72, the evaluation value calculation unit 68 calculates the evaluation value for each of the code tables included in the present generation code table set using the confusion matrix. At S73, the control unit 70 determines whether a predetermined condition is satisfied.

For example, the control unit 70 detects the smallest evaluation value out of the evaluation values of the code tables included in the code table set. The control unit 70 determines whether the smallest evaluation value is not changed in generations the number of which is equal to or larger than a predetermined number. When the smallest evaluation value is not changed in generations the number of which is equal to or larger than the predetermined number, the control unit 70 determines that a predetermined condition is satisfied.

If the predetermined condition is not satisfied (No at S73), the control unit 70 causes the processing to proceed to S74. If the predetermined condition is satisfied (Yes at S73), the control unit 70 causes the processing to proceed to S76.

At S74, the change unit 64 creates a code table set in a next generation from the present generation code table set using the genetic algorithm. For example, the change unit 64 selects a plurality of code tables having high fitness (having small evaluation values) from the present generation code table set, performs the crossover processing and the mutation processing on the selected code tables, and creates the next generation code table set.

At S75, the control unit 70 sets the next generation code table set as the present generation code table set. The control unit 70 causes the processing to return to S72, from which the processing is repeated. In this way, the control unit 70 can update the code table set such that the evaluation value becomes small using the genetic algorithm.

At S76, the control unit 70 outputs the code table having the evaluation value satisfying a reference condition out of the code tables included in the code table set in the generation satisfying the predetermined condition. For example, the control unit 70 outputs the code table having the smallest evaluation value out of the code tables included in the generation code table set satisfying the predetermined condition.

As a result of the processing described above, the creation device 12 can create the code table that reduces false recognition by the recognition device 16. The recognition system 10 according to the third embodiment, thus, can recognize the code word formed on the object 20 highly accurately.

Structure of a Computer According to the Embodiments

Figure 17:
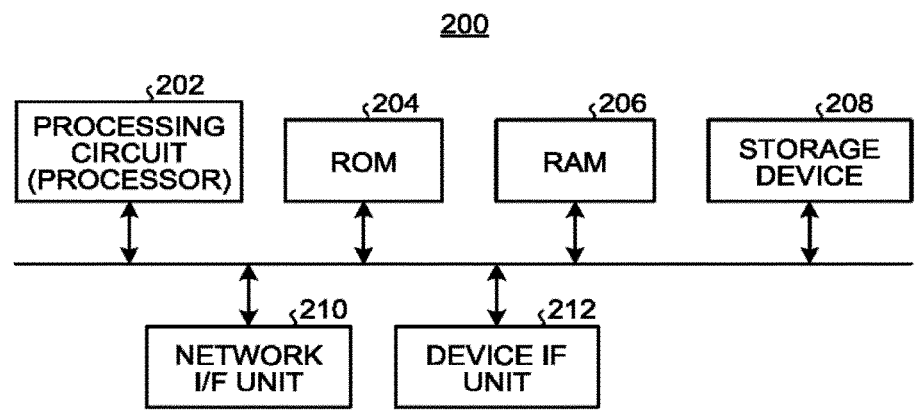
FIG. 17 is a schematic diagram illustrating a structure of a computer according to the embodiments.

FIG. 17 is a schematic diagram illustrating a structure of a computer 200 according to the embodiments. The creation device 12, the first information processing device 26 of the image forming device 14, and the second information processing device 32 of the recognition device 16, which are described in the respective embodiments, can be achieved by the computer 200 illustrated in FIG. 17, for example.

The computer 200 has the same structure as a typical computer. The computer 200 includes a processing circuit 202, a read only memory (ROM) 204, a random access memory (RAM) 206, a storage device 208, a network interface (I/F) unit 210, and a device IF unit 212. The processing circuit 202, the ROM 204, the RAM 206, the storage device 208, the network I/F unit 210, and the device IF unit 212 are coupled one another via a bus.

The processing circuit 202 includes a single or a plurality of processors (e.g., central processing units). The processing circuit 202 develops a program stored in the storage device 208 in the RAM 206, and executes the program to control respective units such that input and output are performed and data is processed. The ROM 204 stores therein a start program that reads a boot program from the storage device 208 to the RAM 206. The RAM 206 stores therein data as a working area of the processing circuit 202.

The storage device 208 is a hard disc drive or a flash memory, for example. The storage device 208 stores therein an operating system, application programs, and data. Those programs are recorded into a computer readable recording medium with an installable format or an executable file, and distributed. The programs may be downloaded from a server and distributed.

The network I/F unit 210 is an interface device for connecting the computer 200 to a network. The device I/F unit 212 is an interface device for connecting the computer 200 to external devices. Examples of the external devices include the first sensing device 22, the printing device 24, the second sensing device 28, and the imaging device 30.

The program executed by the computer 200 in the embodiments is recorded into a computer readable recording medium with an installable format or an executable file, and provided. Examples of the recording medium include compact disc read only memories (CD-ROMs), flexible disks (FDs), CD-recordables (CD-Rs), and digital versatile discs (DVDs). The program executed by the computer 200 in the embodiments may be stored in a computer connected to a network such as the Internet, and provided by being downloaded via the network. The program executed by the computer 200 in the embodiments may be provided or distributed via a network such as the Internet. The program in the embodiments may be embedded and provided in the ROM 204, for example.

The program causing the computer 200 to function as the creation device 12 includes an initial code table creation module, a change module, an evaluation value calculation module, and a control module. A single or a plurality of processors (processing circuit 202) of the computer 200 reads the program from the storage medium (e.g., the storage device 208) and executes the program. The respective modules are loaded into a main storage device (RAM 206). A single or a plurality of processors (processing circuit 202) function as the initial code table creation unit 62, the change unit 64, the evaluation value calculation unit 68, and the control unit 70. The RAM 206 or the storage device 208 functions as the second confusion matrix storage unit 66. A part or the whole of the initial code table creation unit 62, the change unit 64, the evaluation value calculation unit 68, and the control unit 70 may be achieved by hardware other than the processor.

For example, in the first embodiment, a method is described for reducing the evaluation value of the code table using hill climbing method, and, in the third embodiment, a method is described for reducing the evaluation value of the code table using a genetic algorithm. The creation device 12 may employ other methods, as metaheuristics for optimization, than the hill climbing method and the genetic algorithm without departing from the function to create the code table having a smaller evaluation value. Examples of the other methods include an annealing method and a tabu search method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A creation device that creates a code table including a plurality of code words, the code table being used by an image forming device and a recognition device, the image forming device forming a code image representing a code word selected from the code table on an object, the recognition device identifying the code word represented by the code image based on a result of character recognition of the code image formed on the object, the code table, and a confusion matrix preliminarily created, and the confusion matrix representing probabilities that characters represented by an image are recognized as the respective characters, when the image forming device forms, on the object, the image representing the characters, and the image recognition device performs character recognition on the image, the creation device comprising:

a hardware processor configured to:
    change the code table;
    calculate, using the confusion matrix, an evaluation value representing a possibility that the code word included in the changed code table is wrongly recognized; and cause the change of the code table and the calculation of the evaluation value to be repeated such that the evaluation value becomes small, and output the code table at a stage where a predetermined condition is satisfied.

2. The device according to claim 1, wherein
the hardware processor outputs the code table having the smallest evaluation value at the stage where the predetermined condition is satisfied.

3. The device according to claim 1, wherein
the hardware processor calculates, as the evaluation value, a value of a sum of individual evaluation values of the respective code words included in the code table, and
each of the individual evaluation values is an approximate value of a probability that the recognition device identifies a code word different from a corresponding code word.

4. The device according to claim 3, wherein
the hardware processor calculates the evaluation value by expression (1):

$$E = \sum_{j=1}^{m} E(j) \quad (1)$$

where E is the evaluation value, j is an integer from one to m, and is a number designating the code word included in the code table, m is the number of code words included in the code table, and E(j) is the individual evaluation value of the jth code word included in the code table.

5. The device according to claim 4, wherein
the recognition device calculates a logarithmic likelihood of each of the code words included in the code table using expression (2) in relation to the recognition result, and identifies the code word having the smallest calculated logarithmic likelihood as the code word represented in the code image:

$$D(j) = -\ln C(a(j,1),r(1)) - \ln C(a(j,2),r(2)) - \ldots - \ln C(a(j,n),r(n)) \quad (2)$$

where D(j) is the logarithmic likelihood of the jth code word included in the code table in relation to the recognition result, a(j,x) is a number that designates the xth character in the jth code word included in the code table, x being an integer from one to n, r(x) is a number that designates the xth character in the recognition result, C(a,r) represents a probability that the ath character formed on a surface of the object and represented by a first image is recognized as the rth character, the probability being included in the confusion matrix.

6. The device according to claim 5, wherein
the hardware processor calculates the individual evaluation value by expression (3):

$$E(j) = \sum_{h=1, h \neq j}^{m} E(j,h) \quad (3)$$

where h is an integer from one to m, and is the number designating the code word included in the code table, E(j,h) represents an approximate value of a possibility that the logarithmic likelihood of the jth code word in relation to the recognition result is larger than the logarithmic likelihood of the hth code word in relation to the recognition result when the image forming device forms the code image representing the jth code word on the object and the recognition device performs the character recognition on the code image.

7. The device according to claim 1, wherein
the hardware processor changes a part of the code table,
the hardware processor confirms the change of the code table when the evaluation value of the changed code table is smaller than the evaluation value of the code table before the change, and further changes the changed code table, and
the hardware processor cancels the change of the code table when the evaluation value of the changed code table is not smaller than the evaluation value of the code table before the change, and changes the code table again.

8. The device according to claim 7, wherein
the hardware processor outputs the code table when a reduction of the evaluation value stops.

9. The device according to claim 1, wherein
the hardware processor manages a code table set including a plurality of code tables generation by generation,
the hardware processor creates the code table set in a next generation from the code table set in a present generation using a genetic algorithm, and
the hardware processor outputs the code table having the evaluation value satisfying a reference condition out of the code tables included in the code table set in a generation satisfying a predetermined condition.

10. A computer program product having a non-transitory computer readable recoding medium including a plurality of computer executable commands for searching for data, wherein the commands, when executed by a computer, cause the computer to function as the creation device according to claim 1.

11. A creation device that creates a code table including a plurality of code words, the code table being used by an image forming device and a recognition device,
the image forming device forming a code image representing a code word selected from the code table on an object,
the recognition device identifying the code word represented by the code image based on a result of character recognition of the code image formed on the object, the code table, and a confusion matrix preliminarily created,
the confusion matrix representing probabilities that characters represented by an image are recognized as the respective characters, when the image forming device forms, on the object, the image representing the characters, and the image recognition device performs character recognition on the image, and
the creation device comprising a hardware processor configured to:
change the code table;
calculate, using the confusion matrix, a difference evaluation value representing a difference between a first evaluation value and a second evaluation value, the first evaluation value representing a possibility that the code word included in the changed code table is wrongly recognized, the second evaluation value representing a possibility that the code word included in the code table before the change is wrongly recognized; and
cause the change of the code table and the calculation of the difference evaluation value to be repeated such that the difference evaluation value is smaller than zero, and output the code table at a stage where a predetermined condition is satisfied.

12. The device according to claim 11, wherein
the hardware processor changes a part of the code table, and the hardware processor confirms the change of the code table when the difference evaluation value is smaller than zero, and further changes the changed code table, and the hardware processor cancels the change of the code table when the difference evaluation value is not smaller than zero, and changes the code table again.

13. The device according to claim 12, wherein the hardware processor outputs the code table when a reduction of the evaluation value stops.

14. A recognition system comprising:
an image forming device configured to form a code image on an object, the code image representing a code word selected from a code table including a plurality of code words;
a recognition device configured to identify the code word represented by the code image based on a result of character recognition of the code image formed on the object, the code table, and a confusion matrix preliminarily created; and
a creation device configured to create the code table that is used by the image forming device and the recognition device, wherein
the confusion matrix represents respective probabilities that characters represented by an image are recognized as the respective characters, when the image forming device forms, on the object, the image representing the characters, and the image recognition device performs character recognition on the image, and
the creation device includes a hardware processor configured to:
change the code table;
calculate, using the confusion matrix, an evaluation value representing a possibility that the code word included in the changed code table is wrongly recognized; and
cause the change of the code table and the calculation of the evaluation value to be repeated such that the evaluation value becomes small, and output the code table at a stage where a predetermined condition is satisfied.

15. A creation method that is implemented by a creation device creating a code table including a plurality of code words, the code table being used by an image forming device and a recognition device,
the image forming device forming a code image representing a code word selected from the code table on an object,
the recognition device identifying the code word represented by the code image on the basis of a result of character recognition of the code image formed on the object, the code table, and a confusion matrix preliminarily created,
the confusion matrix representing probabilities that characters represented by an image are recognized as the respective characters, when the image forming device forms, on the object, the image representing the characters, and the image recognition device performs character recognition on the image, the creation method comprising:
by the creation device,
changing the code table;
calculating, using a confusion matrix, an evaluation value representing a possibility that the code word included in the changed code table is wrongly recognized; and
causing the change of the code table and the calculation of the evaluation value to be repeated such that the evaluation value becomes small, and outputting the code table at a stage where a predetermined condition is satisfied.

* * * * *